March 17, 1936.  C. SAURER  2,034,640

RESILIENT MOTOR SUPPORT

Filed Oct. 25, 1932   2 Sheets-Sheet 1

INVENTOR
Curt Saurer

ATTORNEYS

March 17, 1936.   C. SAURER   2,034,640
RESILIENT MOTOR SUPPORT
Filed Oct. 25, 1932   2 Sheets-Sheet 2
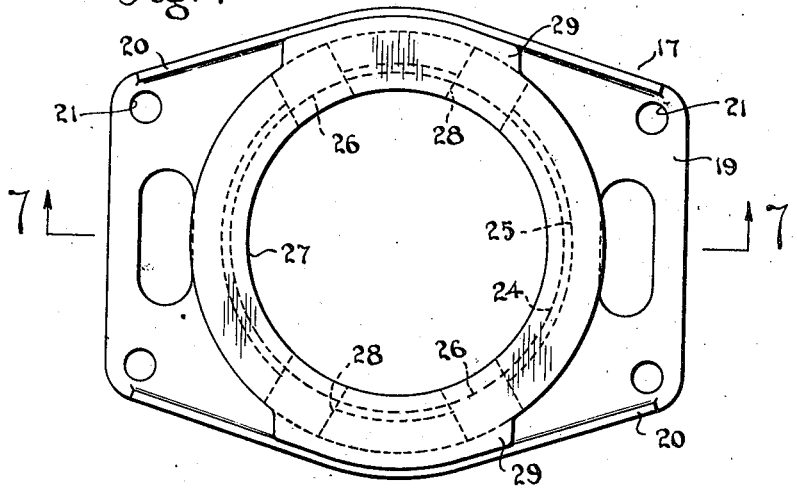
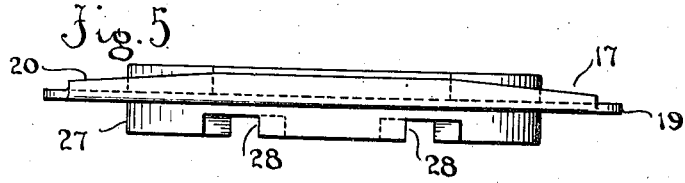
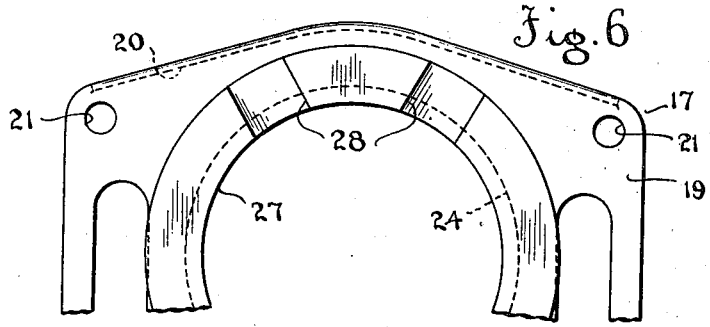
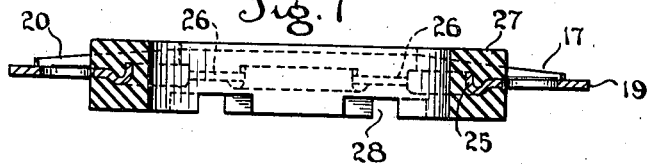
INVENTOR
Curt Saurer
BY Ely & Barrow
ATTORNEYS Patented Mar. 17, 1936

2,034,640

UNITED STATES PATENT OFFICE 2,034,640

RESILIENT MOTOR SUPPORT

Curt Saurer, Akron, Ohio, assignor to The Firestone Tire & Rubber Company, Akron, Ohio, a corporation of Ohio Application October 25, 1932, Serial No. 639,417

6 Claims. (Cl. 248—7)

This invention relates to resilient motor supports, and more especially it relates to resilient supports such as may be used between the motor or engine of an automobile and the frame thereof.

The invention is of primary utility for use with automobile engines having three-point suspension, wherein it constitutes the rear engine support, the other two engine supports being at the front thereof and preferably comprising resilient mountings.

The chief objects of the invention are to reduce noise and wear due to the vibration of a motor; to damp and suppress vibration of an automobile engine so that said vibration is not transmitted to the frame of the automobile; and to provide a resilient motor support that will accomplish the foregoing objects in a superior manner. Other objects will be manifest in the following specification.

Of the accompanying drawings:

Figure 4 is a front elevation of the rear motor support;

Figure 5 is a bottom edge view thereof;

Figure 6 is a rear elevation of the rear motor support, a part thereof being broken away; and Figure 7 is a section on the line 7—7 of Figure 4.

Figure 1:
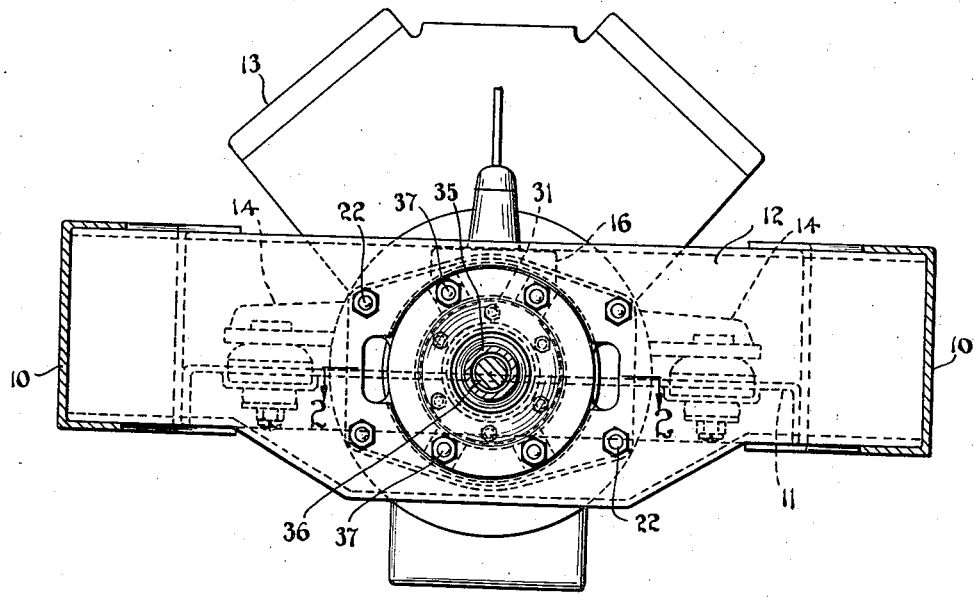
Figure 1 is an end elevation of an automobile motor and rear motor support bracket, and a resilient motor support embodying the invention, in its preferred form, in operative relation to the motor and rear support bracket.
Figure 2:
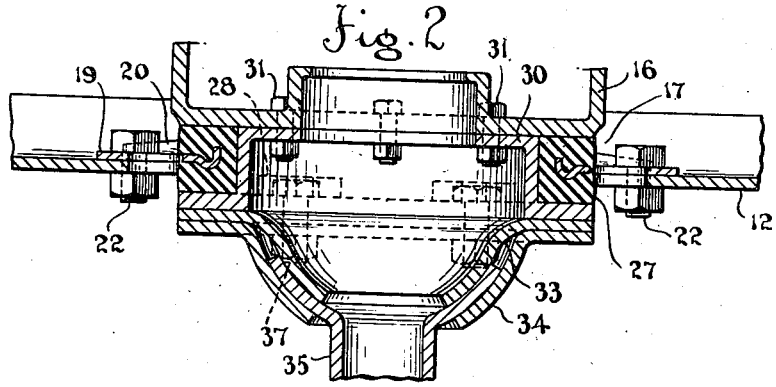
Figure 2 is a fragmentary section on the line 2—2 of Figure 1.

Referring now to Figure 1 of the drawings, 10, 10 are respective side rails of the frame of an automobile, 11 is a front motor support bracket, 12 is a rear motor support bracket, and 13 is the usual internal combustion engine or motor of the automobile. The front end of the motor 13 is formed with laterally extending arms 14, 14, and respective resilient mountings 15, 15 are positioned between the end portions of arms 14 and the front motor support bracket 11. The rear end of the motor comprises the usual gear case 16, and the improved resilient motor support 17 embodying the present invention is mounted between said gear case and the rear motor support bracket 12 in a manner subsequently to be described.

As is most clearly shown in Figures 4 to 7 inclusive, the resilient support 17 comprises a generally rectangular metal plate 19 disposed with its long dimension horizontal, the top and bottom edges of the plate being somewhat convex or bowed, and each being formed with a rearwardly-extending marginal flange 20. At its four corners the plate 19 is formed with bolt holes 21 which receive the bolts 22 by which the plate is secured to the support bracket 12.

In the middle of the plate 19 is a relatively large circular aperture 24, and the marginal portion of the plate around said aperture is reversely bent to form a flange 25. At four points circumferentially of the aperture 24 there is a break in the flange 25, at which points the plate structure 19 is flat to the edge of the aperture, as shown at 26, 26.

A ring of resilient rubber composition 27 is vulcanized to the plate 19 in such a manner as to overlie the periphery of the aperture 24 and both sides of the adjacent plate structure, the flange 25 thus being disposed substantially centrally within the ring structure 27. At four points the rear face of the ring 27 is formed with shallow radial recesses 28, 28, which recesses are coincident with the points 26 where the plate flange 25 is cut away. On the front face of the plate 19 the ring 27 is extended into contact with the respective flanges 20 as shown at 29, 29, Figure 4.

The motor 13 is connected to the resilient motor support 17 through the agency of an annular collar or coupling 30 that is generally Z-shape in cross section, said coupling being secured to the gear case 16, in coaxial relation thereto, by means of bolts 31, 31. The coupling 30 is so constructed as to have a sliding fit with the inner periphery of the resilient ring 27, and to overlie the rear face of said ring so as to confine the ring between the coupling and the rear face of the gear case 16. The ring-engaging surface of the coupling 30 is of less extent axially than the axial thickness of the ring 27, with the result that the ring is placed under compression when the bolts 31 are set up. Since the ring 27 is confined on three sides, the compression will extend substantially to all parts of its structure, including its inner peripheral portion. Flow of the rubber under compression will occur in the recesses 28 and at the unconfined outer periphery of the ring.

Mounted on the rear face of coupling 30 are a pair of plates, 33, 34 having axial concavoconvex portions that are axially apertured and spaced apart to receive the complementally shaped end portion of a tubular member 35 that encloses the crank shaft 36, Figure 1, of the motor 13. The arrangement is such that the member 35 has limited universal movement with relation to plates 33, 34. The plates 33, 34 are secured to the coupling 30 by bolts 37, 37, the heads of which are disposed within the recesses 28 of the ring 27.

Figure 3:
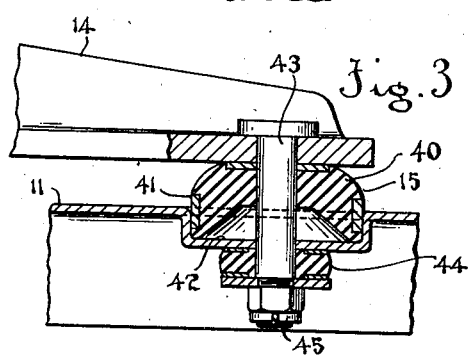
Figure 3 is a sectional view of one of the front motor supports.

The resilient mountings 15 at the front of the motor may be of any suitable construction, and are shown in detail in Figure 3 as a compression shear type mounting comprising a concavo-convex rubber structure 40 having an inextensible peripheral ring or collar 41. The mounting is positioned within a shallow recess 42 in the bracket 11, and is axially apertured to receive a bolt 43 by which the arm 14 is connected to said bracket. A rubber cushion or washer 44 may be disposed between the bracket 11 and the nut 45 on the bolt 43 for cushioning the rebound or upward phase of motor vibration in a vertical direction.

When relative lateral and axial movements, due to vibration, occur between the motor support bracket 12 and the motor 13, they will be resisted and suppressed by the compressed rubber of the ring 27, which will flow at its outer peripheral face. Because of the normal compressed condition of the ring 27, the friction between the ring and the parts engaging the same is sufficient to prevent slippage, whereby the ring is enabled to receive and absorb torsional vibration of the motor without being otherwise connected thereto than through the frictional engagement mentioned.

The motor mounting 15 is so constructed as to present a relatively large portion of its surface for frictional engagement of the motor parts, yet is securely vulcanized to the immovable plate 19 in a manner to provide a relatively large surface area of attachment, yet providing ample space for the flow of the rubber when compressed. The improved motor mounting is of relatively simple construction, is efficient in operation, and achieves the other advantages set out in the foregoing statement of objects.

Modification may be resorted to without departing from the spirit of the invention or the scope of the appended claims.

What is claimed is:

1. The combination of a motor support bracket, a motor having an end portion positioned laterally of said bracket, a resilient ring fixedly secured to said bracket, and a coupling member extending through the resilient ring and secured to the adjacent end portion of the motor, said ring and motor being mounted concentrically with the driveshaft of the motor and said coupling member being so constructed as to compress the resilient ring in an axial direction by reason of its connection with the motor.

2. In an automobile, the combination of a motor support bracket, a motor having an end portion positioned laterally of said bracket, a ring of resilient material, a plate disposed in the central plane of the ring and having a portion extending into the ring and vulcanized thereto, said plate being attached to said bracket, and an annular coupling member extending through said ring and secured to the motor, said ring being compressed in an axial direction between said coupling and said motor and against both sides of said plate.

3. In a resilient motor support, the combination of a metal plate formed with a central aperture and having the marginal portion about said aperture formed with a flange, and a body of resilient rubber composition vulcanized to said plate, said rubber composition being rectangular in cross section and overlying the perimeter of the plate aperture and the respective faces of the plate adjacent thereto.

4. A combination as defined in claim 3 in which the plate flange is cut away at a plurality of points, and the resilient member is formed with shallow radial recesses coincident with said cut away portions.

5. The combination of a motor, a frame for supporting said motor, and a three-point resilient motor support comprising a rear motor mounting encircling the drive-shaft of the motor, and a pair of front motor mountings comprising resilient cushion members supporting the front of the motor at the sides thereof, said rear motor mounting including a pair of plates disposed at right angles to the shaft of the motor and an annular cushion of resilient rubber confined between said plates, one of said plates being adapted to be secured to said frame member and the other of said plates being adapted to be secured to said motor whereby torque vibrations of said motor will be absorbed by said cushion as the latter is placed under shear stress by the relative rotation between the motor and frame, and as said front motor mountings are stressed in opposite directions, said annular cushion being adapted to absorb axial vibrations and thrust of said motor by compression of the rubber between said plates.

6. The combination of a motor having a rear supporting bracket substantially in the vertical plane of the crankshaft of the motor, a pair of resilient motor mountings at the front end of said motor for damping vibrations and carrying vertical loads by resistance to compression of their resilient elements, and an annular mounting including an annular resilient cushion member surrounding the bracket at the other end of the motor substantially at right angles to the axis of the crankshaft for damping vibrations, carrying vertical loads and resisting torque reactions by the resistance of its resilient element to shearing strains, said annular cushion member being confined in planes at right angles to the crankshaft for damping vibrations and for absorbing thrust in a direction axially of the crankshaft by compression of said annular cushion member.

CURT SAURER.